(12) United States Patent
Itamoto et al.

(10) Patent No.: US 10,577,015 B2
(45) Date of Patent: Mar. 3, 2020

(54) STEERING CONTROL APPARATUS (71) Applicant: JTEKT CORPORATION, Osaka-shi, Osaka (JP)

(72) Inventors: Hidenori Itamoto, Tajimi (JP); Takashi Kageyama, Okazaki (JP); Toshie Hibi, Okazaki (JP); Akihiro Tomita, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/177,057

(22) Filed: Oct. 31, 2018

(65) Prior Publication Data
US 2019/0135334 A1 May 9, 2019

(30) Foreign Application Priority Data

Nov. 7, 2017 (JP) ................. 2017-215014

(51) Int. Cl.
*B62D 5/04* (2006.01)
*B62D 15/02* (2006.01)
(Continued)

(52) U.S. Cl.
CPC .......... *B62D 5/0463* (2013.01); *B62D 5/046* (2013.01); *B62D 5/0481* (2013.01); *B62D 6/002* (2013.01);
(Continued)

(58) Field of Classification Search
None
See application file for complete search history.

(56) References Cited

U.S. PATENT DOCUMENTS 8,958,951 B2 * 2/2015 Mikamo .............. B62D 5/0463
701/41
9,248,852 B2 * 2/2016 Mikamo ................ B62D 5/046
(Continued)

FOREIGN PATENT DOCUMENTS

EP 2 757 023 A2 7/2014
JP 2012166776 A * 9/2012
(Continued)

OTHER PUBLICATIONS

Apr. 3, 2019 Extended European Search Report issued in European Patent Application No. 18204498.2.

*Primary Examiner* — Shelley Chen
(74) *Attorney, Agent, or Firm* — Oliff PLC (57) ABSTRACT

Provided is a steering control apparatus capable of executing driving assistance control even during rotation angle sensor-less control. When an induced voltage generated in a motor is equal to or lower than a threshold voltage at an early stage of execution of the rotation angle sensor-less control and when the driving assistance control is executed based on a command value from a higher-level control apparatus, a second pre-addition angle that is based on the command value is used as a second addition angle in place of a first pre-addition angle that is based on a steering torque. Therefore, even in a situation in which the steering torque is not detected due to, for example, execution of driving assistance, an estimated electrical angle of the motor is calculated by integrating the second addition angle. Then, driving of the motor is controlled based on the calculated estimated electrical angle.

5 Claims, 6 Drawing Sheets

(51) Int. Cl.
  *H02P 6/182* (2016.01)
  *H02P 21/18* (2016.01)
  *H02P 29/032* (2016.01)
  *B62D 6/00* (2006.01)
  *B62D 6/02* (2006.01)

(52) U.S. Cl.
  CPC ......... *B62D 15/025* (2013.01); *B62D 15/027* (2013.01); *H02P 6/182* (2013.01); *H02P 21/18* (2016.02); *H02P 29/032* (2016.02); *B62D 6/02* (2013.01); *B62D 15/0235* (2013.01)

(56) References Cited

U.S. PATENT DOCUMENTS

| | | | |
|---|---|---|---|
| 2008/0217099 A1* | 9/2008 | Reungwetwattana | B62D 5/0472 180/446 |
| 2008/0294313 A1* | 11/2008 | Aoki | B62D 5/0463 701/43 |
| 2012/0211299 A1* | 8/2012 | Yanai | B62D 5/046 180/446 |
| 2012/0274260 A1* | 11/2012 | Takahashi | B62D 5/0487 318/490 |
| 2012/0299517 A1* | 11/2012 | Niimi | B62D 5/0463 318/432 |
| 2012/0326644 A1* | 12/2012 | Okumura | B62D 5/0487 318/400.21 |
| 2013/0138300 A1 | 5/2013 | Hayama | |
| 2014/0200767 A1* | 7/2014 | Mikamo | B62D 5/0463 701/41 |
| 2014/0207335 A1* | 7/2014 | Mikamo | B62D 5/046 701/41 |
| 2014/0336878 A1* | 11/2014 | Yanai | G01D 5/145 701/41 |
| 2016/0167701 A1* | 6/2016 | Sone | B62D 5/0463 701/43 |
| 2017/0369092 A1* | 12/2017 | Iida | H02P 6/182 |

FOREIGN PATENT DOCUMENTS

| | | |
|---|---|---|
| JP | 2014-138530 A | 7/2014 |
| JP | 5672191 B2 * | 2/2015 |
| JP | 2018113835 A * | 7/2018 |

* cited by examiner

FIG. 7

STEERING CONTROL APPARATUS

INCORPORATION BY REFERENCE

The disclosure of Japanese Patent Application No. 2017-215014 filed on Nov. 7, 2017 including the specification, drawings and abstract, is incorporated herein by reference in its entirety.

BACKGROUND OF THE INVENTION

1. Field of the Invention

The present invention relates to a steering control apparatus.

2. Description of the Related Art

Hitherto, there exists an electric power steering system (EPS) configured to apply a torque of a motor to a steering mechanism of a vehicle as an assist force. As described in, for example, Japanese Patent Application Publication No. 2014-138530 (JP 2014-138530 A), a control apparatus of the EPS controls driving of the motor by using an electrical angle of the motor that is detected through a rotation angle sensor. When any abnormality occurs in the rotation angle sensor, the control apparatus executes so-called rotation angle sensor-less control for controlling the driving of the motor by using an estimated electrical angle that is estimated based on an induced voltage (counter-electromotive voltage) generated in the motor in place of the electrical angle that is based on a detection result from the rotation angle sensor. The control apparatus calculates an addition angle (electrical angle by which the motor rotates in one calculation period) based on the induced voltage, and calculates the estimated electrical angle by integrating the addition angle. The positive or negative sign of the addition angle is determined by, for example, a rotation direction of the motor that is estimated based on the positive or negative sign of a steering torque.

In recent years, advanced driver assistance systems (ADAS) have been developed to achieve various driving assistance functions for further improving the safety of vehicles. Examples of the ADAS include an automatic parking system and a lane keeping assistance system. A control apparatus of the ADAS determines an optimum control method based on the condition of the vehicle on each occasion, and commands individual control over control apparatuses of on-board systems including the control apparatus of the EPS based on the determined control method. The control apparatus of the EPS controls the driving of the motor based on a command value generated by the control apparatus of the ADAS.

When the rotation angle sensor-less control is executed based on the estimated electrical angle, it may be difficult to execute driving assistance control based on the command value from the control apparatus of the ADAS. That is, depending on the details of the driving assistance control, it is conceivable that a driver only puts his/her hands on a steering wheel. In this case, there is a possibility that the steering torque is not detected because the driver does not actively operate the steering wheel. Further, the induced voltage is not generated because the motor does not rotate. Thus, there is concern that the estimated electrical angle cannot be calculated appropriately.

SUMMARY OF THE INVENTION

It is one object of the present invention to provide a steering control apparatus capable of executing driving assistance control even during execution of rotation angle sensor-less control.

One aspect of the present invention relates to a steering control apparatus configured to calculate a current command value for a motor based on at least a steering torque, calculate an estimated electrical angle of the motor based on an induced voltage generated in the motor, and control power supply to the motor by using the calculated estimated electrical angle. The motor is a source of power to be applied to a steering mechanism of a vehicle.

The steering control apparatus includes a first estimated electrical angle calculation circuit, a second estimated electrical angle calculation circuit, a selection circuit, and an integration circuit. The first estimated electrical angle calculation circuit is configured to calculate, based on the induced voltage, a first addition angle that is a change amount of the estimated electrical angle in one calculation period. The second estimated electrical angle calculation circuit is configured to calculate, based on the steering torque, a second addition angle that is a change amount of the estimated electrical angle in one calculation period. The selection circuit is configured to select the first addition angle when the induced voltage is higher than a threshold voltage, and select the second addition angle when the induced voltage is equal to or lower than the threshold voltage. The integration circuit is configured to calculate the estimated electrical angle by integrating the first addition angle or the second addition angle that is selected by the selection circuit.

When driving assistance control is executed based on a command value generated by a higher-level control apparatus in order to change the current command value, the second estimated electrical angle calculation circuit uses the second addition angle that is calculated based on the command value by the higher-level control apparatus in place of the second addition angle that is based on the steering torque.

Depending on the details of the driving assistance control, it is conceivable that a driver only puts his/her hands on a steering wheel. In this case, there is a possibility that the steering torque is not detected because the driver does not actively operate the steering wheel.

According to the configuration described above, when the induced voltage generated in the motor is equal to or lower than the threshold voltage and when the driving assistance control is executed based on the command value from the higher-level control apparatus, the second addition angle that is based on the command value is used in place of the second addition angle that is based on the steering torque. Therefore, even in a situation in which the steering torque is not detected due to, for example, execution of driving assistance, the estimated electrical angle of the motor is calculated by integrating the second addition angle that is based on the command value. Thus, driving of the motor can be controlled based on the calculated estimated electrical angle. Accordingly, the driving assistance control can be executed even during the execution of so-called rotation angle sensor-less control for controlling the motor based on the estimated electrical angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering control apparatus of one embodiment of the present invention is described below.

Figure 1:
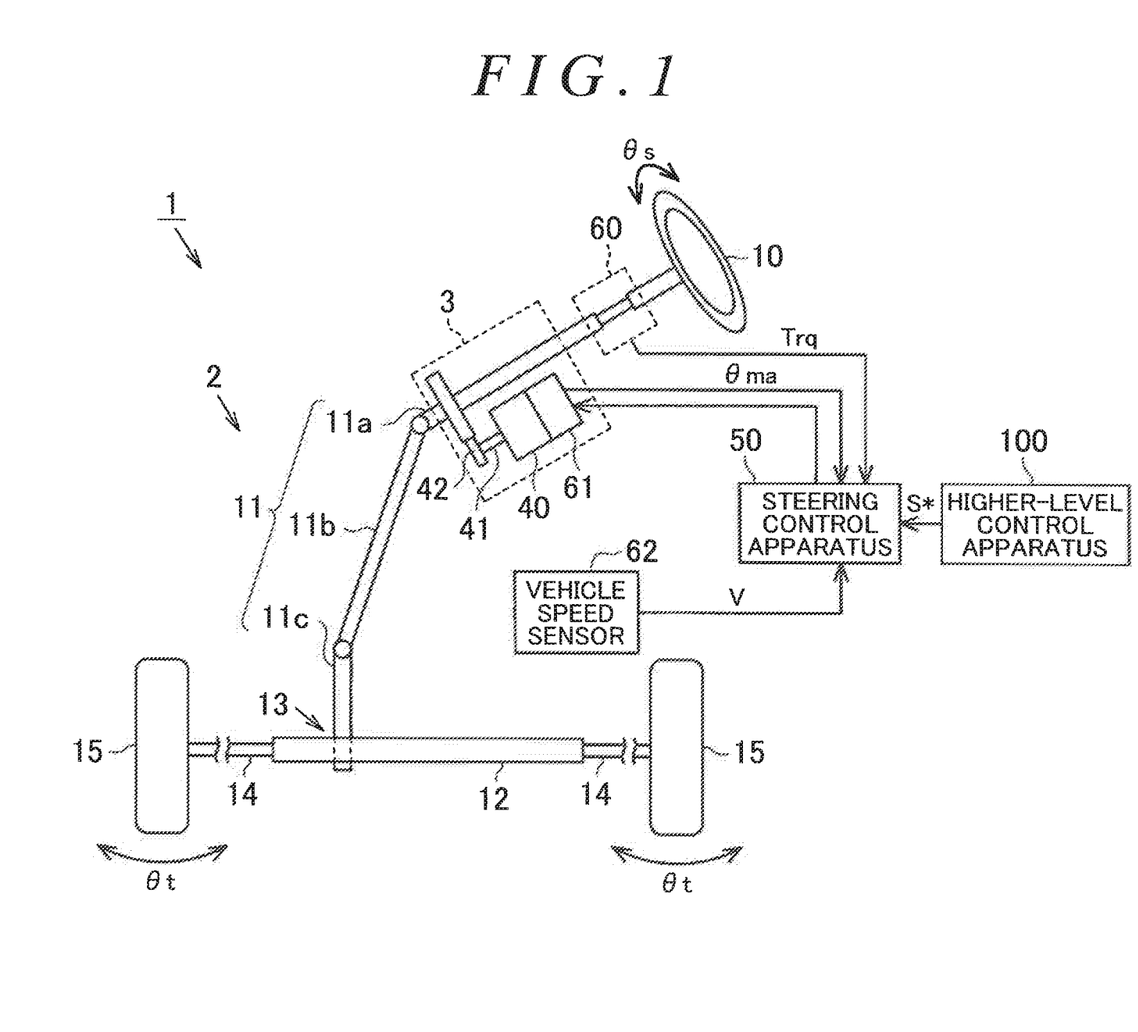
FIG. 1 is a configuration diagram illustrating an overview of an electric power steering system on which a steering control apparatus of one embodiment is mounted.

As illustrated in FIG. 1, an electric power steering system 1 includes a steering mechanism 2 and an assist mechanism 3. The steering mechanism 2 turns steered wheels 15 based on a driver's operation for a steering wheel 10. The assist mechanism 3 assists the driver's steering operation. A steering control apparatus 50 is mounted on the electric power steering system 1.

The steering mechanism 2 includes the steering wheel 10 and a steering shaft 11. The steering shaft 11 is fixed to the steering wheel 10. The steering shaft 11 includes a column shaft 11a, an intermediate shaft 11b, and a pinion shaft 11c. The column shaft 11a is coupled to the steering wheel 10. The intermediate shaft 11b is coupled to the lower end of the column shaft 11a. The pinion shaft 11c is coupled to the lower end of the intermediate shaft 11b. The lower end of the pinion shaft 11c is coupled to a rack shaft 12 via a rack and pinion mechanism 13. The right and left steered wheels 15 are coupled to both ends of the rack shaft 12 via tie rods 14, respectively. Thus, rotational motion of the steering wheel 10, that is, the steering shaft 11 is converted to reciprocating linear motion of the rack shaft 12 in its axial direction (lateral direction in FIG. 1) via the rack and pinion mechanism 13 constituted by the pinion shaft 11c and the rack shaft 12. The reciprocating linear motion is transmitted to the right and left steered wheels 15 and 15 via the tie rods 14 coupled to the respective ends of the rack shaft 12. Thus, steered angles θt of the steered wheels 15 and 15 are changed.

The assist mechanism 3 includes a motor 40. The motor 40 is a source of power (assist force) to be applied to the steering mechanism 2. Examples of the motor 40 to be employed include a three-phase brushless motor configured to rotate based on three-phase (U, V, and W) driving electric power. A rotation shaft 41 of the motor 40 is coupled to the column shaft 11a via a speed reducing mechanism 42. The speed reducing mechanism 42 reduces the speed of rotation of the motor 40 (rotation shaft 41), and transmits, to the column shaft 11a, a rotational force of the motor 40 that is obtained through the speed reduction. The rotational force transmitted to the column shaft 11a is converted to an axial force of the rack shaft 12 via the rack and pinion mechanism 13. The driver's steering operation is assisted by applying the converted force to the rack shaft 12 as the assist force.

The steering control apparatus 50 controls driving of the motor 40 based on detection results from various sensors. Examples of various sensors include a torque sensor 60, a rotation angle sensor 61, and a vehicle speed sensor 62. The torque sensor 60 is provided on the column shaft 11a. The torque sensor 60 detects a steering torque Trq applied to the steering shaft 11 through the driver's steering operation. The rotation angle sensor 61 is provided on the motor 40. The rotation angle sensor 61 detects an electrical angle (rotation angle) θma of the motor 40. The vehicle speed sensor 62 detects a vehicle speed V that is a traveling speed of a vehicle.

A cooperative control system such as advanced driver assistance systems (ADAS) may be mounted on the vehicle to assists a driving operation of the driver so as to achieve better driving with safety. In this case, cooperative control of the steering control apparatus 50 and control apparatuses of other on-board systems is executed in the vehicle. The cooperative control is a technology of controlling motion of a vehicle in cooperation between control apparatuses of a plurality of types of on-board system. For example, a higher-level control apparatus 100 is mounted on the vehicle. The higher-level control apparatus 100 collectively controls the control apparatuses of various on-board systems. The higher-level control apparatus 100 determines an optimum control method based on the condition of the vehicle on each occasion, and commands individual control over various on-board control apparatuses based on the determined control method.

The higher-level control apparatus 100 generates a command value S* for executing driving assistance control such as emergency evasion control, lane keeping assistance control, or parking assistance control. The emergency evasion control is control for assisting steering in order to prompt an operation for emergency evasion. The lane keeping assistance control is control for assisting traveling of a vehicle along its lane by assisting driver's steering when the traveling vehicle may move out of its lane. The parking assistance control is control for assisting driver's steering when the driver parks a vehicle in a garage or the like. The steering control apparatus 50 controls the motor 40 based also on the command value S* generated by the higher-level control apparatus 100.

The command value S* differs depending on the details of the driving assistance control. For example, the higher-level control apparatus 100 generates a target steering angle (angle command value) as a command value for executing the lane keeping assistance control or the parking assistance control. The target steering angle is a target value of a steering angle that is necessary to cause the vehicle to travel along its lane or park the vehicle at a predetermined parking position based on the traveling condition of the vehicle on each occasion. The steering control apparatus 50 calculates an addition current command value through execution of angle feedback control for causing an actual steering angle θs to follow the target steering angle. The calculated addition current command value is added to current command values calculated by a current command value calculation circuit 70.

The actual steering angle θs may be calculated based on the electrical angle θma of the motor 40 that is detected through the rotation angle sensor 61. Since the motor 40 is coupled to the steering shaft 11 via the speed reducing mechanism 42, there is a correlation between the electrical angle θma of the motor 40 and the steering angle θs that is a rotation angle of the steering wheel 10 (steering shaft 11). Therefore, the steering angle θs can be calculated based on the electrical angle θma of the motor 40. When a steering sensor is provided on the steering shaft 11, the steering angle θs may be detected through the steering sensor.

For example, the higher-level control apparatus 100 calculates an addition torque command value or an addition current command value as a command value for executing the emergency evasion control. The addition torque command value is a request for a motor torque, and is used for generating a motor torque necessary for emergency evasion. The addition torque command value is added to the current command values (Id* and Iq*) calculated by the current command value calculation circuit 70 while being converted to a current value. The addition current command value is a request for a motor current, and is a value of a current to be added to the current command values calculated by the current command value calculation circuit 70.

When a predefined execution determination condition is satisfied, the higher-level control apparatus 100 executes the driving assistance control. The execution determination condition differs depending on the details of assistance of the driving assistance control. Example of the execution determination condition of the lane keeping control include the following conditions (A) to (C).

(A) A lane keeping control function is turned ON through an operation for a switch (not illustrated) provided on a driver's seat or the like. The switch generates an electric signal Ssw indicating its ON/OFF state.

(B) The vehicle speed V is equal to or higher than an actuation lower limit speed of the lane keeping control function. For example, when the lane keeping control function is intended for expressways and limited-access highways, the actuation lower limit speed is set to a value higher than legal speeds of ordinary roads.

(C) The value of the steering torque Trq is lower than a threshold (provided that the value is not zero). The threshold is set from the viewpoint of determination on a driver's active steering operation. When the value of the steering torque Trq is equal to or higher than the threshold during execution of the lane keeping control, the execution of the lane keeping control is stopped. This is because priority is given to a steering operation intended by the driver.

The execution determination condition of driving assistance control other than the lane keeping control differs depending on the details of assistance, but preferably includes the condition (A), that is, the condition that "a switch for ON/OFF of the driving assistance control function is turned ON".

Next, the electrical configuration of the steering control apparatus 50 is described.

Figure 2:
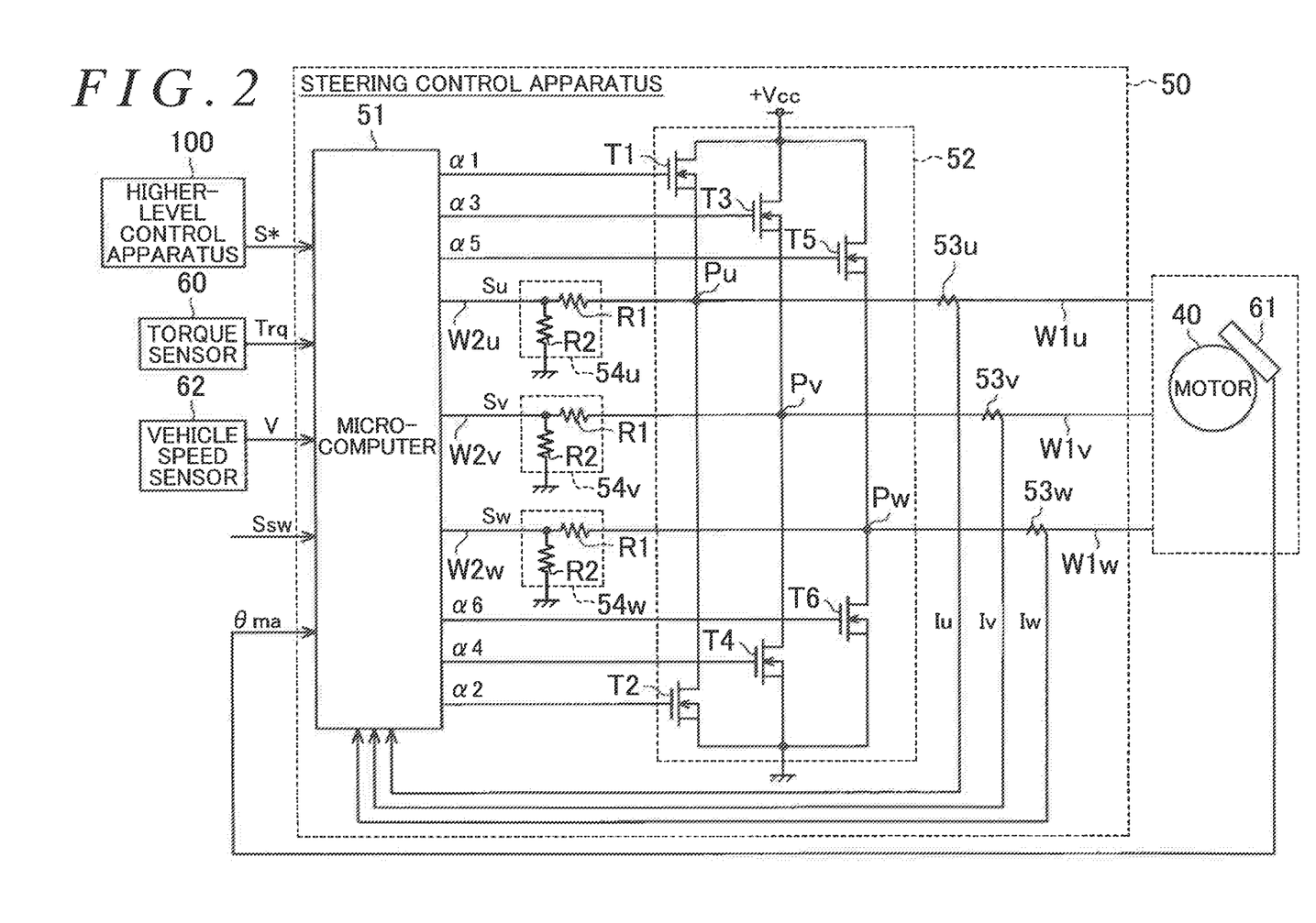
FIG. 2 is a block diagram illustrating the electrical configuration of the electric power steering system of the embodiment.

As illustrated in FIG. 2, the steering control apparatus 50 includes a microcomputer 51 and a drive circuit 52. The microcomputer 51 generates a motor control signal for controlling the driving of the motor 40. The drive circuit 52 supplies a current to the motor 40 based on the motor control signal generated by the microcomputer 51. The drive circuit 52 and the motor 40 are connected together by power supply lines W1u to W1w. Current sensors 53u, 53v, and 53w are provided on the power supply lines W1u to W1w, respectively. The microcomputer 51 and the drive circuit 52 are connected together by signal lines W2u, W2v, and W2w. Voltage sensors 54u, 54v, and 54w are provided on the signal lines W2u, W2v, and W2w, respectively. The voltage sensors 54u to 54w divide terminal voltages of respective phases of the motor 40 through voltage division resistors R1 and R2, and generate detection signals Su to Sw based on values obtained through the voltage division.

The microcomputer 51 acquires detection results from the torque sensor 60, the rotation angle sensor 61, and the vehicle speed sensor 62 (Trq, θma, and V). The microcomputer 51 also acquires detection results from the current sensors 53u, 53v, and 53w (Iu, Iv, and Iw) and detection results from the voltage sensors 54u, 54v, and 54w (detection signals Su, Sv, and Sw). Based on the acquired detection results, the microcomputer 51 generates pulse width modulation (PWM) drive signals α1 to α6 as the motor control signal. The PWM drive signals α1 to α6 are signals for causing the drive circuit 52 to execute PWM drive. When the command value S* for executing the driving assistance control is generated by the higher-level control apparatus 100, the microcomputer 51 generates the PWM drive signals α1 to α6 based also on the command value S*.

The drive circuit 52 is a PWM inverter circuit configured to convert a direct current (DC) voltage from a DC power supply (power supply voltage "+Vcc") such as an on-board battery to an alternating current (AC) voltage and supply the AC voltage to the motor 40. The drive circuit 52 is formed such that three sets of switching arms each having two switching elements connected in series are connected in parallel. Switching elements T1 and T2 constitute a switching arm corresponding to the U phase. Switching elements T3 and T4 constitute a switching arm corresponding to the V phase. Switching elements T5 and T6 constitute a switching arm corresponding to the W phase. The switching elements T1, T3, and T5 are provided on the power supply side, and the switching elements T2, T4, and T6 are provided on a ground side.

A middle point Pu between the switching element T1 and the switching element T2, a middle point Pv between the switching element T3 and the switching element T4, and a middle point Pw between the switching element T5 and the switching element T6 are connected to coils of the respective phases of the motor 40 via the power supply lines W1u to W1w. By switching ON/OFF of the switching elements T1 to T6 based on the PWM drive signals α1 to α6 generated by the microcomputer 51, the DC voltage supplied from the DC power supply is converted to three-phase (U-phase, V-phase, and W-phase) AC voltages. The three-phase AC voltages obtained through the conversion are supplied to the coils of the respective phases of the motor 40 via the power supply lines W1u to W1w, thereby driving the motor 40.

Figure 3:
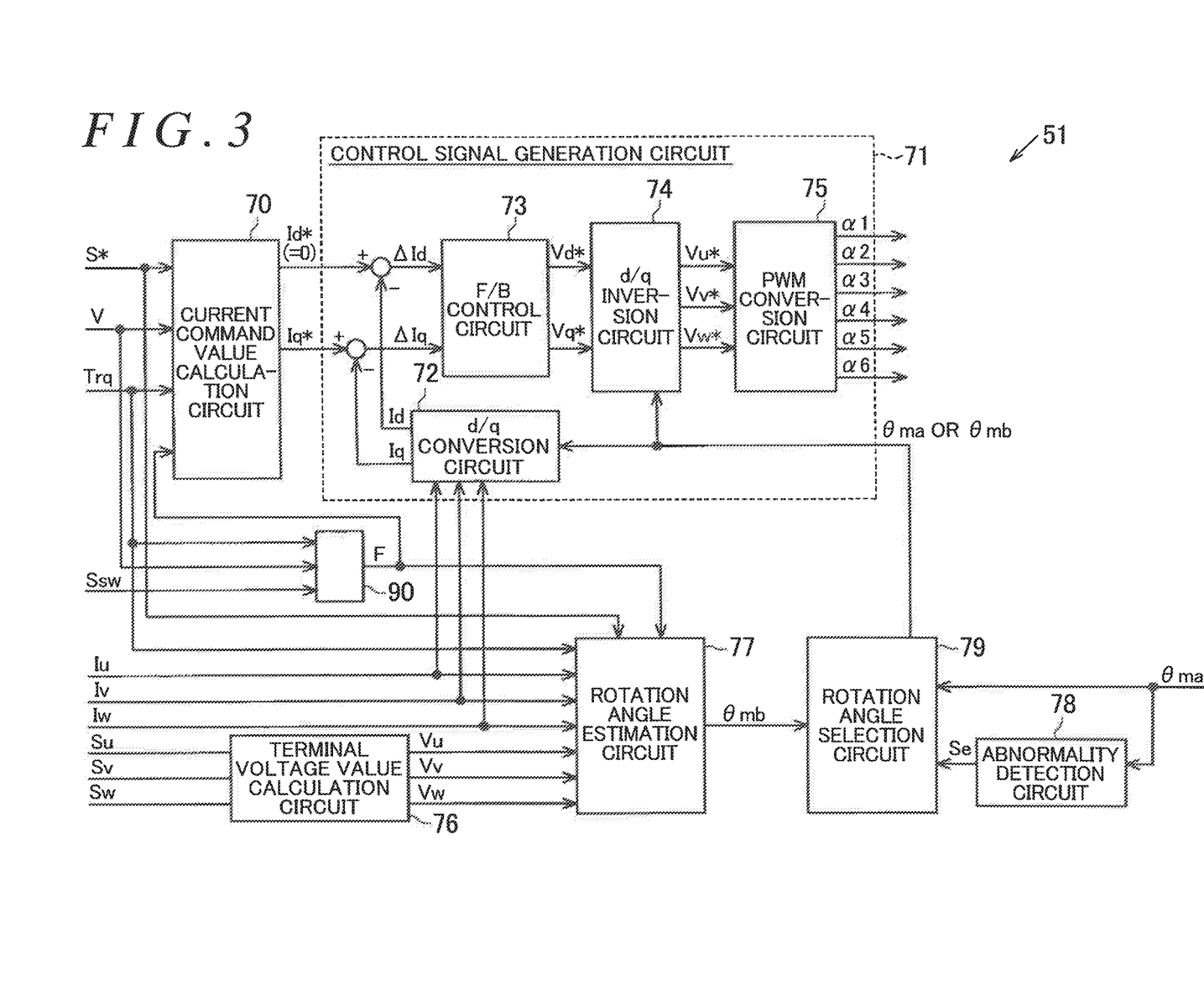
FIG. 3 is a functional block diagram of a microcomputer of the steering control apparatus of the embodiment.

Next, the microcomputer 51 is described in detail. As illustrated in FIG. 3, the microcomputer 51 includes the current command value calculation circuit 70 and a control signal generation circuit 71.

The current command value calculation circuit 70 calculates current command values. The current command value is a target value of a current amount corresponding to an assist force to be generated in the motor 40. The current command value calculation circuit 70 acquires the vehicle speed V and the steering torque Trq. The current command value calculation circuit 70 calculates a q-axis current command value Iq* and a d-axis current command value Id* based on the vehicle speed V and the steering torque Trq. The q-axis current command value Iq* is a current command value on a q-axis in a d/q coordinate system. The d-axis current command value Id* is a current command value on a d-axis in the d/q coordinate system. The current command value calculation circuit 70 calculates a q-axis current command value Iq* having a higher absolute value as the absolute value of the steering torque Trq increases and as the value of the vehicle speed V decreases. When the command value S* is generated by the higher-level control apparatus 100, the current command value calculation circuit 70 calculates the current command values (Iq* and Id*) based also on the command value S*. In this example, the current command value calculation circuit 70 fixes the d-axis current command value Id* to zero.

The control signal generation circuit 71 generates the PWM drive signals α1 to α6 corresponding to the current command values. The control signal generation circuit 71 acquires the current command values (Iq* and Id*), the current values Iu, Iv, and Iw of the respective phases, and the electrical angle θma. The control signal generation circuit 71 generates the PWM drive signals α1 to α6 through execution of current feedback control based on the current values Iu, Iv, and Iw of the respective phases and the electrical angle θma so that actual current values of the motor 40 (q-axis current value and d-axis current value) follow the current command values (Iq* and Id*).

In the control signal generation circuit 71, an estimated electrical angle θmb calculated by a rotation angle estimation circuit 77 described later may be used in place of the electrical angle θma detected through the rotation angle sensor 61.

The control signal generation circuit 71 includes a d/q conversion circuit 72, a feedback control circuit (hereinafter referred to as "F/B control circuit") 73, a d/q inversion circuit 74, and a PWM conversion circuit 75. The d/q conversion circuit 72 acquires the current values Iu, Iv, and Iw of the respective phases and the electrical angle θma. The d/q conversion circuit 72 calculates a d-axis current value Id and a q-axis current value Iq by mapping the current values Iu, Iv, and Iw of the respective phases on the d/q coordinates based on the electrical angle θma. The d-axis current value Id and the q-axis current value Iq are actual current values of the motor 40 in the d/q coordinate system.

The F/B control circuit 73 acquires a d-axis current deviation ΔId and a q-axis current deviation ΔIq. The d-axis current deviation ΔId is obtained by subtracting the d-axis current value Id from the d-axis current command value Id*. The q-axis current deviation ΔIq is obtained by subtracting the q-axis current value Iq from the q-axis current command value Iq*. The F/B control circuit 73 calculates a d-axis voltage command value Vd* by executing current feedback control based on the d-axis current deviation ΔId so that the d-axis current value Id follows the d-axis current command value Id*. The F/B control circuit 73 calculates a q-axis voltage command value Vq* by executing current feedback control based on the q-axis current deviation ΔIq so that the q-axis current value Iq follows the q-axis current command value Iq*.

The d/q inversion circuit 74 acquires the d-axis voltage command value Vd*, the q-axis voltage command value Vq*, and the electrical angle θma. The d/q inversion circuit 74 calculates voltage command values Vu*, Vv*, and Vw* of the respective phases in a three-phase AC coordinate system by mapping the d-axis voltage command value Vd* and the q-axis voltage command value Vq* on the three-phase AC coordinate system based on the electrical angle θma.

The PWM conversion circuit 75 acquires the voltage command values Vu*, Vv*, and Vw* of the respective phases. The PWM conversion circuit 75 generates the PWM drive signals α1 to α6 by executing PWM conversion for the voltage command values Vu*, Vv*, and Vw* of the respective phases. The PWM drive signals α1 to α6 are applied to gate terminals of the corresponding switching elements T1 to T6 of the drive circuit 52.

When an abnormality occurs in the rotation angle sensor 61 for some reason and the electrical angle θma cannot be detected properly, it may be difficult to control the motor 40 appropriately. In this example, so-called rotation angle sensor-less control is executed as backup control when an abnormality occurs in the rotation angle sensor 61. That is, the microcomputer 51 estimates an electrical angle based on an induced voltage (counter-electromotive force) generated in the motor 40, and continuously controls the motor 40 by using the estimated electrical angle.

As illustrated in FIG. 3, the microcomputer 51 includes a terminal voltage value calculation circuit 76, the rotation angle estimation circuit 77, an abnormality detection circuit 78, a rotation angle selection circuit 79, and a determination circuit 90 as components for executing the rotation angle sensor-less control.

The determination circuit 90 determines whether the execution determination condition of the driving assistance control is satisfied. For example, in the case of lane keeping control, the determination circuit 90 determines whether the execution determination conditions (A) to (C) of the lane keeping control that are described above are satisfied based on the electric signal Ssw, the vehicle speed V, and the steering torque Trq. The electric signal Ssw indicates a state of the switch to be used by the driver to turn ON or OFF the lane keeping control function. The determination circuit 90 sets the value of a flag F based on a result of the determination of whether the execution determination conditions are satisfied. When the determination circuit 90 determines that the execution determination conditions are satisfied, the determination circuit 90 sets the flag F to "1". When the determination circuit 90 determines that the execution determination conditions are not satisfied, the determination circuit 90 sets the flag F to "0".

The terminal voltage value calculation circuit 76 acquires the detection signals Su, Sv, and Sw that are the detection results from the voltage sensors 54u, 54v, and 54w, respectively. The terminal voltage value calculation circuit 76 calculates terminal voltage values Vu, Vv, and Vw of the respective phases of the motor 40 based on the detection signals Su, Sv, and Sw.

The rotation angle estimation circuit 77 acquires the terminal voltage values Vu, Vv, and Vw of the respective phases, the steering torque Trq, and the current values Iu, Iv, and Iw of the respective phases. The rotation angle estimation circuit 77 calculates the estimated electrical angle θmb based on the terminal voltage values Vu, Vv, and Vw of the respective phases, the steering torque Trq, and the current values Iu, Iv, and Iw of the respective phases.

The abnormality detection circuit 78 acquires the electrical angle θma. The abnormality detection circuit 78 detects an abnormality of the rotation angle sensor 61 based on the electrical angle θma. For example, the abnormality detection circuit 78 detects the abnormality of the rotation angle sensor 61 when the absolute value of a difference between a present value and a previous value of the electrical angle θma deviates from a predetermined permissible range. The permissible range is set in consideration of a control period of the microcomputer 51 or a detection tolerance of the rotation angle sensor 61. The abnormality detection circuit 78 generates an abnormality detection signal Se based on a detection result. The abnormality detection signal Se includes information indicating the presence or absence of the abnormality of the rotation angle sensor 61.

The rotation angle selection circuit 79 acquires the estimated electrical angle θmb calculated by the rotation angle estimation circuit 77, the abnormality detection signal Se generated by the abnormality detection circuit 78, and the electrical angle θma. When the abnormality detection signal Se indicates that no abnormality occurs in the rotation angle sensor 61, the rotation angle selection circuit 79 selects, as a motor control electrical angle, the electrical angle θma that is a detection result from the rotation angle sensor 61. When the abnormality detection signal Se indicates that an abnormality occurs in the rotation angle sensor 61, the rotation angle selection circuit 79 selects, as the motor control electrical angle, the estimated electrical angle θmb calculated by the rotation angle estimation circuit 77.

Figure 4:
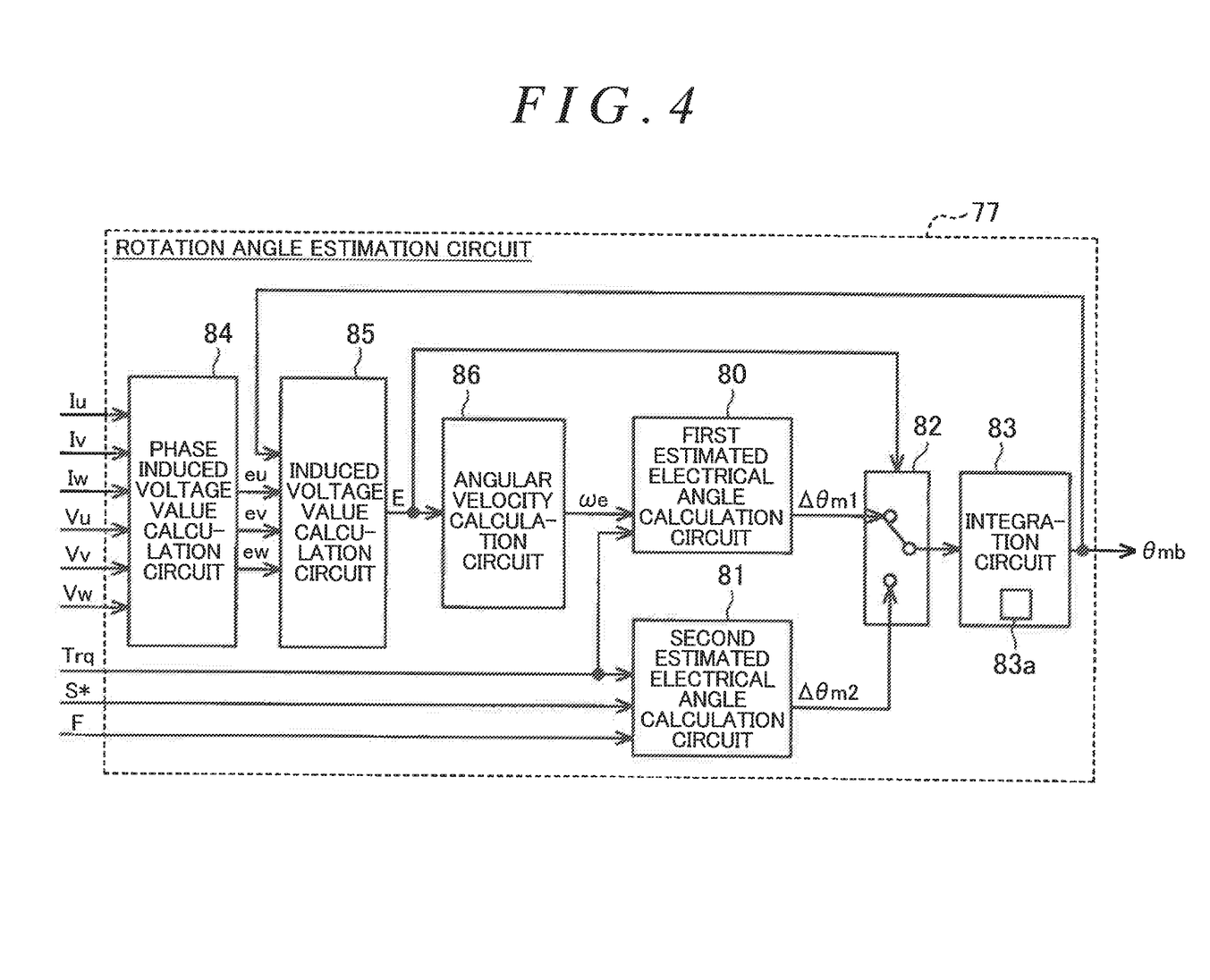
FIG. 4 is a functional block diagram of a rotation angle estimation circuit of the steering control apparatus of the embodiment.

Next, the rotation angle estimation circuit 77 is described in detail. As illustrated in FIG. 4, the rotation angle estimation circuit 77 includes a phase induced voltage value calculation circuit 84, an induced voltage value calculation circuit 85, an angular velocity calculation circuit 86, a first estimated electrical angle calculation circuit 80, a second estimated electrical angle calculation circuit 81, a switching circuit 82 serving as a selection circuit, and an integration circuit 83.

The phase induced voltage value calculation circuit 84 acquires the current values Iu, Iv, and Iw of the respective phases and the terminal voltage values Vu, Vv, and Vw of the respective phases. The phase induced voltage value calculation circuit 84 calculates induced voltage values eu, ev, and ew of the respective phases in the three-phase AC coordinate system based on the current values Iu to Iw of the respective phases and the terminal voltage values Vu, Vv, and Vw of the respective phases. The phase induced voltage value calculation circuit 84 may calculate the induced voltage values eu, ev, and ew of the respective phases in consideration of resistance values of the coils of the respective phases of the motor 40.

The induced voltage value calculation circuit 85 acquires the induced voltage values eu, ev, and ew of the respective phases that are calculated by the phase induced voltage value calculation circuit 84 and a previous value of the estimated electrical angle θmb (value calculated earlier by one calculation period). By using the previous value of the estimated electrical angle θmb, the induced voltage value calculation circuit 85 converts the induced voltage values eu, ev, and ew of the respective phases to induced voltage values (ed and eq) that are two-phase vector components in the d/q coordinate system. The induced voltage value calculation circuit 85 calculates, as an induced voltage value (absolute value) E, a square root of the sum of squares of the two-phase induced voltage values (ed and eq).

The angular velocity calculation circuit 86 acquires the induced voltage value E calculated by the induced voltage value calculation circuit 85. The angular velocity calculation circuit 86 calculates an estimated angular velocity ωe based on the induced voltage value E. The estimated angular velocity ωe is an estimated value of an angular velocity of the motor 40 that is a change amount of the electrical angle θma of the motor 40 per unit time. There is a proportional relationship between the induced voltage value E and the estimated angular velocity ωe. Therefore, the estimated angular velocity ωe is obtained by dividing the induced voltage value E by a predefined induced voltage constant (counter-electromotive force constant).

There is a correlation between the electrical angle θma of the motor 40 and the steering angle θs that is the rotation angle of the steering wheel 10 (steering shaft 11). Therefore, there is also a correlation between the angular velocity of the motor 40 and a steering speed (ωs) that is a change amount of the steering angle θs of the steering wheel 10 per unit time.

The first estimated electrical angle calculation circuit 80 acquires the steering torque Trq and the estimated angular velocity ωe calculated by the angular velocity calculation circuit 86. The first estimated electrical angle calculation circuit 80 calculates a first addition angle Δθm1 based on the estimated angular velocity ωe. The first addition angle Δθm1 is a change amount of the estimated electrical angle θmb in one calculation period. The first estimated electrical angle calculation circuit 80 calculates the first addition angle Δθm1 by multiplying the estimated angular velocity ωe by the control period. The first estimated electrical angle calculation circuit 80 sets the positive or negative sign of the value of the first addition angle Δθm1 while the positive or negative sign of the value of the steering torque Trq is assumed to be a rotation direction of the motor 40.

The second estimated electrical angle calculation circuit 81 acquires the steering torque Trq. The second estimated electrical angle calculation circuit 81 calculates a second addition angle Δθm2 based on the steering torque Trq. The second addition angle Δθm2 is a change amount of the estimated electrical angle θmb in one calculation period. The second estimated electrical angle calculation circuit 81 sets the positive or negative sign of the value of the second addition angle Δθm2 based on the positive or negative sign of the value of the steering torque Trq. The second estimated electrical angle calculation circuit 81 is described later in detail.

The switching circuit 82 acquires the first addition angle Δθm1, the second addition angle Δθm2, and the induced voltage value E. The switching circuit 82 switches the addition angle to be supplied to the integration circuit 83 between the first addition angle Δθm1 and the second addition angle Δθm2 through comparison between the induced voltage value E and a threshold voltage (positive value). When the induced voltage value E is higher than the threshold voltage, the switching circuit 82 supplies the first addition angle Δθm1 to the integration circuit 83. When the induced voltage value E is equal to or lower than the threshold voltage, the switching circuit 82 supplies the second addition angle Δθm2 to the integration circuit 83.

The threshold voltage is set from the viewpoint of whether a deviation of the estimated electrical angle θmb calculated based on the induced voltage value E is a value that falls within a permissible range required based on product specifications or the like, in other words, whether a calculation accuracy of the estimated electrical angle θmb that is required based on product specifications or the like can be secured.

There are correlations between the induced voltage value E and the angular velocity of the motor 40 and between the angular velocity of the motor 40 and the steering speed. Therefore, the induced voltage value E increases as the steering speed increases. Conversely, the induced voltage value E decreases as the steering speed decreases. Thus, the induced voltage value E is equal to or lower than the threshold voltage in a situation in which the steering speed is lower. In this situation, noise included in the detection value of each sensor (53u to 53w or 54u to 54w) is likely to have a significant influence. Therefore, it is difficult to secure the calculation accuracy of the estimated electrical angle θmb. In a situation in which the angular velocity of the motor 40 and furthermore the steering speed are higher, the induced voltage value E is higher than the threshold voltage.

In this situation, the calculation accuracy of the estimated electrical angle θmb can be secured.

The integration circuit 83 acquires the first addition angle Δθm1 or the second addition angle Δθm2 that is supplied from the switching circuit 82. The integration circuit 83 includes a storage circuit 83a configured to store the previous value of the estimated electrical angle θmb (value obtained earlier by one calculation period). The integration circuit 83 calculates the estimated electrical angle θmb by integrating the first addition angle Δθm1 or the second addition angle Δθm2 with the previous value of the estimated electrical angle θmb that is stored in the storage circuit 83a.

Thus, the rotation angle estimation circuit 77 calculates the estimated electrical angle θmb based on the induced voltage value E in a situation in which the calculation accuracy of the estimated electrical angle θmb can be secured (induced voltage value E>threshold voltage). That is, the rotation angle estimation circuit 77 calculates the estimated electrical angle θmb by integrating the first addition angle Δθm1 calculated by the first estimated electrical angle calculation circuit 80. In a situation in which the calculation accuracy of the estimated electrical angle θmb cannot be secured (induced voltage value E≤threshold voltage), the rotation angle estimation circuit 77 calculates the estimated electrical angle θmb based on the steering torque Trq in place of the induced voltage value E. That is, the rotation angle estimation circuit 77 calculates the estimated electrical angle θmb by integrating the second addition angle Δθm2 calculated by the second estimated electrical angle calculation circuit 81.

When the rotation angle sensor-less control for controlling the motor 40 by using the estimated electrical angle θmb is executed, it may be difficult to execute the driving assistance control based on the command value S* generated by the higher-level control apparatus 100. For example, depending on the details of the driving assistance control, it is conceivable that the driver only puts his/her hands on the steering wheel 10.

In this case, there is a possibility that the steering torque Trq is not detected because the driver does not actively operate the steering wheel 10. Further, the induced voltage is not generated because the motor 40 does not rotate. Thus, there is concern that the estimated electrical angle θmb cannot be calculated appropriately. In this example, the second estimated electrical angle calculation circuit 81 is configured as follows.

Figure 5:
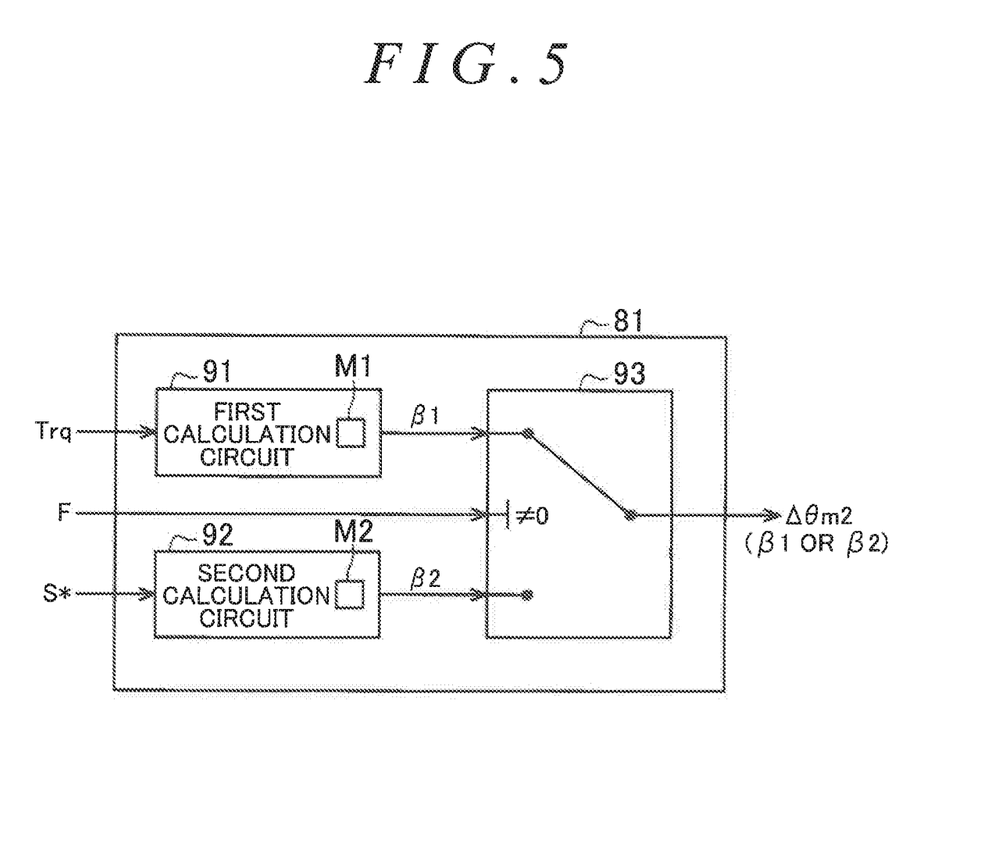
FIG. 5 is a functional block diagram of a second estimated electrical angle calculation circuit of the rotation angle estimation circuit of the embodiment.

Next, the second estimated electrical angle calculation circuit is described. As illustrated in FIG. 5, the second estimated electrical angle calculation circuit 81 includes a first calculation circuit 91, a second calculation circuit 92, and a switching circuit 93 serving as a pre-selection circuit.

The first calculation circuit 91 calculates a first pre-addition angle β1 based on the steering torque Trq. The first calculation circuit 91 has a first map M1, and calculates the first pre-addition angle β1 by using the first map M1.

Figure 6:
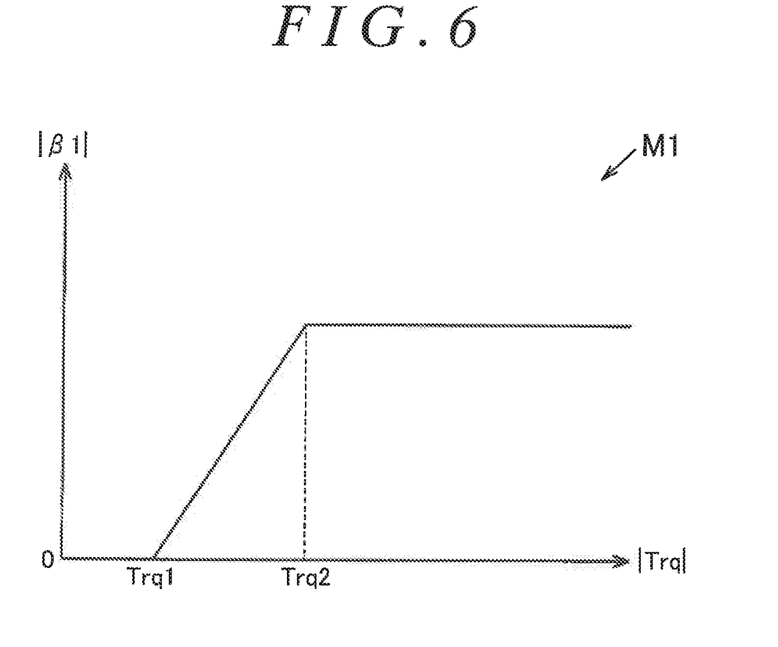
FIG. 6 is a graph illustrating a first map to be used in the second estimated electrical angle calculation circuit of the embodiment.

As illustrated in a graph of FIG. 6, the first map M1 has a horizontal axis that represents the steering torque Trq and a vertical axis that represents the first pre-addition angle β1, and defines a relationship between the steering torque Trq and the first pre-addition angle β1. The first map M1 has the following characteristics. That is, when the absolute value of the steering torque Trq is equal to or higher than a first threshold Trq1, the absolute value of the first pre-addition angle β1 increases as the absolute value of the steering torque Trq increases, and the absolute value of the first pre-addition angle β1 is kept at a constant value from a second threshold Trq2 (>Trq1). The positive or negative sign of the first pre-addition angle β1 is identical to the positive or negative sign of the steering torque Trq. A dead band is provided in a range near a point where the absolute value of the steering torque Trq is zero (to be more exact, lower than the first threshold Trq1). In the dead band, the value of the first pre-addition angle β1 is zero.

As illustrated in FIG. 5, the second calculation circuit 92 calculates a second pre-addition angle β2 based on the command value S* generated by the higher-level control apparatus 100. The second calculation circuit 92 has a second map M2, and calculates the second pre-addition angle β2 by using the second map M2.

Figure 7:
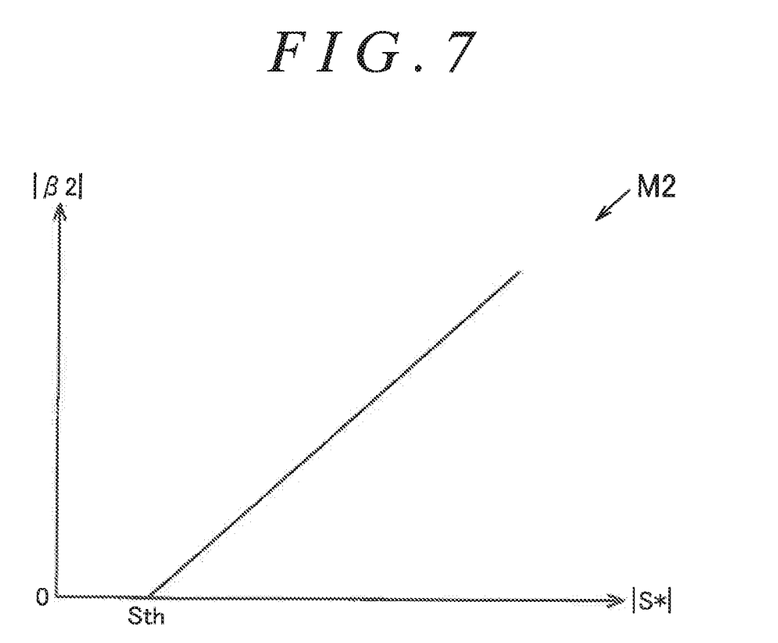
FIG. 7 is a graph illustrating a second map to be used in the second estimated electrical angle calculation circuit of the embodiment.

As illustrated in a graph of FIG. 7, the second map M2 has a horizontal axis that represents the command value S* and a vertical axis that represents the second pre-addition angle β2, and defines a relationship between the command value S* and the second pre-addition angle β2. The second map M2 has the following characteristics. That is, when the absolute value of the command value S* is equal to or higher than a threshold Sth, the absolute value of the second pre-addition angle β2 increases as the absolute value of the command value S* increases. The positive or negative sign of the second pre-addition angle β2 is identical to the positive or negative sign of the command value S*. A dead band is provided in a range near a point where the absolute value of the command value S* is zero (to be more exact, lower than the threshold Sth). In the dead band, the value of the second pre-addition angle β2 is zero.

As illustrated in FIG. 5, the switching circuit 93 acquires, as data input, the first pre-addition angle β1 calculated by the first calculation circuit 91 and the second pre-addition angle β2 calculated by the second calculation circuit 92. The switching circuit 93 acquires, as control input, the value of the flag F that is set by the determination circuit 90. Based on the value of the flag F, the switching circuit 93 switches the value to be supplied to the integration circuit 83 as the second addition angle Δθm2 between the first pre-addition angle β1 and the second pre-addition angle β2. When the value of the flag F is "0", the switching circuit 93 supplies the first pre-addition angle β1 to the switching circuit 82 as the second addition angle Δθm2. When the value of the flag F is "1" (to be more exact, when the value of the flag F is not "0"), the switching circuit 93 supplies the second pre-addition angle β2 to the switching circuit 82 as the second addition angle Δθm2.

According to this embodiment, the following actions and effects can be attained.

(1) Depending on the details of the driving assistance control, there is a possibility that the steering torque Trq is not detected due to, for example, a situation in which the driver does not actively operate the steering wheel 10. In this example, when the induced voltage value E is equal to or lower than the threshold voltage at an early stage from the start of execution of the rotation angle sensor-less control and when the driving assistance control is executed based on the command value S* from the higher-level control apparatus 100, the second pre-addition angle β2 that is based on the command value S* is used as the second addition angle Δθm2 in place of the first pre-addition angle β1 that is based on the steering torque Trq. Therefore, even in the situation in which the steering torque Trq is not detected, the estimated electrical angle θmb is calculated by integrating the second addition angle Δθm2. Thus, the driving of the motor 40 can be controlled based on the calculated estimated electrical angle θmb. When the induced voltage value E is higher than the threshold voltage afterwards, the estimated electrical angle θmb is calculated by integrating the first addition angle Δθm1 in place of the second addition angle Δθm2, and the driving of the motor 40 is controlled based on the calculated estimated electrical angle θmb. Accordingly, the driving assistance control can be executed even when the rotation angle sensor-less control is executed.

(2) The second estimated electrical angle calculation circuit 81 includes the first calculation circuit 91, the second calculation circuit 92, and the switching circuit 93 serving as the pre-selection circuit. The first calculation circuit 91 calculates the first pre-addition angle β1 based on the steering torque Trq. The second calculation circuit 92 calculates the second pre-addition angle β2 based on the command value S*. The switching circuit 93 selects the first pre-addition angle β1 as the second addition angle Δθm2 when the execution determination condition of the driving assistance control that is based on the command value S* is not satisfied, and selects the second pre-addition angle β2 as the second addition angle Δθm2 when the execution determination condition is satisfied. According to this configuration, the first pre-addition angle β1 or the second pre-addition angle β2 is appropriately selected as the second addition angle Δθm2 based on whether the execution determination condition of the driving assistance control is satisfied.

(3) The steering control apparatus 50 includes the rotation angle selection circuit 79. The rotation angle selection circuit 79 selects, as the electrical angle of the motor 40 to be used for controlling power supply to the motor 40, one of the electrical angle θma detected through the rotation angle sensor 61 provided on the motor 40 and the estimated electrical angle θmb calculated by the integration circuit 83. The rotation angle selection circuit 79 selects the electrical angle θma detected through the rotation angle sensor 61 when an abnormality of the rotation angle sensor 61 is not detected, and selects the estimated electrical angle θmb calculated by the integration circuit 83 when the abnormality of the rotation angle sensor 61 is detected. According to this configuration, the power supply to the motor 40 can be controlled continuously by using the estimated electrical angle θmb even when the abnormality occurs in the rotation angle sensor 61.

(4) The second estimated electrical angle calculation circuit 81 has the first map M1 that defines the relationship between the steering torque Trq and the first pre-addition angle β1, and the second map M2 that defines the relationship between the command value S* and the second pre-addition angle β2. The second estimated electrical angle calculation circuit 81 can easily calculate the first pre-addition angle β1 by using the first map M1, and the second pre-addition angle β2 by using the second map M2.

(5) In the first map M1, when the absolute value of the steering torque Trq is lower than the first threshold Trq1, the value of the first pre-addition angle β1 is set to zero. The dead band provided in this manner suppresses influence of an event that the positive value and the negative value of the steering torque Trq are switched frequently and repeatedly near zero, that is, an event that the positive value and the negative value of the first pre-addition angle β1 are switched frequently and repeatedly. Thus, the calculation accuracy of the first pre-addition angle β1 can be secured.

(6) In the second map M2, when the absolute value of the command value S* is lower than the threshold Sth, the value of the second pre-addition angle β2 is set to zero. The dead band provided in this manner suppresses influence of an event that the positive value and the negative value of the command value S* are switched frequently and repeatedly near zero due to influence of noise or the like, that is, an event that the positive value and the negative value of the second pre-addition angle β2 are switched frequently and repeatedly. Thus, the calculation accuracy of the second pre-addition angle β2 can be secured.

This embodiment may be modified as follows.

There may be employed a configuration in which the dead bands are omitted from the first map M1 and the second map M2.

In this example, the rotation angle sensor-less control for controlling the motor 40 based on the estimated electrical angle θmb is executed as backup control for the case where an abnormality occurs in the rotation angle sensor 61. The rotation angle sensor-less control need not be executed as the backup control, but the motor 40 may constantly be controlled without using the rotation angle sensor 61. In this case, the rotation angle sensor 61 may be omitted.

In this example, the steering control apparatus 50 is applied to the electric power steering system of the type in which the assist force is applied to the steering shaft 11 (column shaft 11a). The steering control apparatus 50 may be applied to an electric power steering system of a type in which the assist force is applied to the rack shaft 12. In this case, the torque sensor 60 may be provided on the pinion shaft 11c.

What is claimed is:

1. A steering control apparatus configured to calculate a current command value for a motor based on at least a steering torque, calculate an estimated electrical angle of the motor based on an induced voltage generated in the motor, and control power supply to the motor by using the calculated estimated electrical angle, the motor being a source of power to be applied to a steering mechanism of a vehicle, the steering control apparatus comprising:
   a first estimated electrical angle calculation circuit configured to calculate, based on the induced voltage, a first addition angle that is a change amount of the estimated electrical angle in one calculation period;
   a second estimated electrical angle calculation circuit configured to calculate, based on the steering torque, a second addition angle that is a change amount of the estimated electrical angle in one calculation period;
   a selection circuit configured to select the first addition angle when the induced voltage is higher than a threshold voltage, and select the second addition angle when the induced voltage is equal to or lower than the threshold voltage; and
   an integration circuit configured to calculate the estimated electrical angle by integrating the first addition angle or the second addition angle that is selected by the selection circuit, wherein
   when driving assistance control is executed based on a command value generated by a higher-level control apparatus to change the current command value, the second estimated electrical angle calculation circuit uses the second addition angle that is calculated based on the command value by the higher-level control apparatus in place of the second addition angle that is based on the steering torque.

2. The steering control apparatus according to claim 1, wherein the second estimated electrical angle calculation circuit includes:
   a first calculation circuit configured to calculate, based on the steering torque, a first pre-addition angle that is a change amount of the estimated electrical angle in one calculation period;

a second calculation circuit configured to calculate, based on the command value by the higher-level control apparatus, a second pre-addition angle that is a change amount of the estimated electrical angle in one calculation period; and a pre-selection circuit configured to select the first pre-addition angle as the second addition angle when an execution determination condition of the driving assistance control that is based on the command value is not satisfied, and select the second pre-addition angle as the second addition angle when the execution determination condition is satisfied.

3. The steering control apparatus according to claim 2, wherein the second estimated electrical angle calculation circuit has a first map that defines a relationship between the steering torque and the first pre-addition angle, and a second map that defines a relationship between the command value and the second pre-addition angle, and the second estimated electrical angle calculation circuit is configured to calculate the first pre-addition angle by using the first map, and the second pre-addition angle by using the second map.

4. The steering control apparatus according to claim 1, further comprising a rotation angle selection circuit configured to select, as an electrical angle of the motor to be used for controlling the power supply to the motor, one of an electrical angle detected through a rotation angle sensor provided on the motor and the estimated electrical angle calculated by the integration circuit, wherein the rotation angle selection circuit is configured to select the electrical angle detected through the rotation angle sensor when an abnormality of the rotation angle sensor is not detected, and select the estimated electrical angle calculated by the integration circuit when the abnormality of the rotation angle sensor is detected.

5. The steering control apparatus according to claim 3, wherein a dead band is set in a predetermined range including zero in each of the first map and the second map.

* * * * *